United States Patent

Bennett

[11] Patent Number: 5,255,704
[45] Date of Patent: Oct. 26, 1993

[54] LEAKPROOF HYDRAULIC VALVE

[75] Inventor: Barry D. Bennett, Harleysville, Pa.

[73] Assignee: Technical Products & Precision Manufacturing Co., Hatfield, Pa.

[21] Appl. No.: 9,663

[22] Filed: Jan. 27, 1993

[51] Int. Cl.$^5$ .................................. F16K 25/00
[52] U.S. Cl. ........................ 137/454.5; 137/625.38; 251/225; 251/325
[58] Field of Search ............... 137/454.5, 219, 625.38; 251/225, 325, 344

[56] References Cited

U.S. PATENT DOCUMENTS

| 1,419,650 | 6/1922 | Sorensen | 137/454.5 |
| 3,330,294 | 7/1967 | Manning et al. | 137/625.38 X |
| 3,654,950 | 4/1972 | Hamm | 137/219 |

FOREIGN PATENT DOCUMENTS 1078126  11/1954  France .................. 251/325

*Primary Examiner*—Stephen M. Hepperle
*Attorney, Agent, or Firm*—Gregory J. Gore

[57] ABSTRACT

A simplified two-piece, cartridge-type hydraulic valve provides increased valve seat area and improved hydrodynamics. The present valve is a plug-type valve in which the piston is integral with the valve stem, and the valve seat is inserted into the base at the bottom end of the gland. The stem is threadably fitted into the center of the gland, whereby turning the top of the stem moves the piston reciprocally between open and closed positions. Fluid flow enters through ports in the base of the piston and is directed upward past the valve seat area at the top of the piston. The piston ports are radially divergent from a center point at the bottom end of the piston to points around the circumference of the top end of the piston in the area of the valve seat. A tapered nose piece is included in the bottom of the gland in the center of the valve seat area in order to improve flow efficiency and reduce turbulence. The top of the piston includes a collar and a rim which projects upward along a portion of the top of the collar about its circumference to aid sealing.

9 Claims, 3 Drawing Sheets

LEAKPROOF HYDRAULIC VALVE

FILED OF THE INVENTION

This invention relates to a cartridge-type, within-a-cavity high pressure hydraulic valve.

BACKGROUND OF THE INVENTION AND DESCRIPTION OF THE PRIOR ART

Cartridge within-a-cavity valves are widely used for controlling many fluids, including applications where the flow control of high pressure hydraulic fluid is desired. Cartridge-type valves are widely used because the internal components of the valve may be easily removed and replaced from a manifold cavity for maintenance and repair.

Cartridge valves are commonly used in a manifold cavity of the type shown in FIG. 1. Referring to this figure, fluid enters the cavity through port 6 and exhausts through port 5. A cylinder 4 receives the valve at the base of the manifold. At least two types of prior art valves have been employed in this application and these are depicted in FIGS. 2 and 3. In both cases, a threaded stem is turned by a handle (as shown in FIG. 1) which moves a tapered piston into and out of contact with the valve seat. As seen in both of these illustrations, each design requires at least three parts; a gland (a), a stem (b), and a valve seat module (c) which threads into the bottom of the gland. The valve seat module includes ports 1 and 2 which receive and exhaust all fluid that moves through the valve.

A significant problem with these prior art valves is leakage. Leakage often occurs because both the stem and the valve seat module are manufactured with threads in the right-hand helix. Upon installation of the valve assembly, the threaded joint between the valve seat module and the gland is secured by a liquid-locking compound. This joint is labeled feature "d" on FIGS. 2 and 3. In use, it is possible to break free this secured threaded connection when turning the valve handle in the clockwise direction to close the valve. This occurs because rotation of the stem against the valve seat imparts a torque to the valve seat module which loosens it. When the threaded engagement between the stem and the valve seat module breaks free, both move in the same direction preventing further force being applied to the stem sealing area. This results in unwanted leakage past the valve seal.

Prior art valves are also deficient in that they do not conform with the desired industry practice of providing sealing valves with "single-line contact". Single-line contact means that each mating component must be concentric so that the contact between them is a continuous line. If this condition is not met, then parts are said to be "eccentric" and the contact patch between mating parts is only a single point. This results in leakage past the other areas along the theoretical contact line that are not touching. Without a consistent single center line throughout the valve and no other means of providing a justified seating service once the valve is assembled, single-line contact sealing of the valve cannot occur.

A further problem with both of these prior art valves is valve seat wear. In high pressure applications, the valve stem is required to be tightly screwed down against the valve seat which has very limited surface area. Hence, the parts wear quickly and need to be replaced often. Also, neither design provides the desired efficiency or sensitive flow metering due to fluid turbulence in the area of the valve seat.

The closest patent prior art which the applicant is aware is U.S. Pat. No. 3,654,950, issued to John R. Hamm, Apr. 11, 1972. The device described in this reference is pertinent in that it shows a reciprocating sleeve-type valve, but it fails to teach or suggest the novel claimed features of the present invention.

SUMMARY OF THE INVENTION

The present invention has been devised in order to solve the problems of leakage, excessive wear, and flow control described above. The present invention achieves its improved performance with the use of a simplified two-piece system with greatly increased valve seat area and improved hydrodynamics. The separate valve seat module employed in the prior art designs depicted in FIGS. 2 and 3 has been eliminated in favor of a plug-type valve in which the valve piston is integral with the valve stem. The valve seat is inserted into the bottom end of gland. This simplified design eliminates the troublesome threaded joint between the valve seat module and the gland. The removal of this joint and the increase in valve seat area has all but eliminated any leakage. Flow metering has also been greatly improved by the use of optimally directed piston ports and a tapered flow deflector nose piece in the valve seat area which improves the hydrodynamic efficiency of the valve. In the valve of the present invention, movement between the mating parts of the valve is perpendicular to the plane of their contact line. Therefore, any eccentricity of the rotary parts does not result in the loss of single line contact. Hence, leakage is prevented.

More specifically, the applicant has invented a cartridge-type hydraulic valve, comprising: a manifold cavity having entry and exit fluid ports; a gland removably secured within the manifold cavity, the gland having a circular valve seat in the bottom thereof; a valve stem having a piston at the bottom, the stem and piston being movable within the gland between open and closed valve positions, the top end of the piston being in contact with the valve seat when the valve is in the closed position; a plurality of piston ports open through opposing top and bottom ends of the piston, the piston ports being radially divergent from a central point at the bottom end of the piston to points around the circumference of the top end of the piston in the area of the valve seat. The bottom of the piston is in fluid communication with the entry port and the top of the piston is in fluid communication with the exit port, whereby movement of the piston selectively restricts the flow of fluid through the manifold cavity. The present invention further includes a collar located at the top end of the piston and protruding therefrom, the collar being the contact point o the piston with the gland. A rim projects upward along a portion of the top of the collar about its circumference, the rim embedded into the valve seat when the valve is closed. A tapered nose piece is at the bottom of the gland in the center of the valve seat, the nose piece being convergent downward toward the piston and away from the valve seat. The piston is reciprocal within a cylinder in the bottom of the manifold cavity, the entry port being at the bottom of the cylinder. A plurality of seals mutually engage the outside of the piston and inside of the cylinder to prevent passage of fluid between the outside of the piston and the cylinder. The gland is threadably engaged into the top of the manifold cavity. The stem is threadably engaged into the center of the gland, whereby turning the top of the stem moves the piston between open and closed positions.

It is, therefore, an object of the present invention to provide a cartridge-type, high pressure hydraulic valve which is leakproof.

It is another object of the present invention to provide a leakproof hydraulic valve which is of a simplified design and inexpensive to manufacture.

It is yet another object of the present invention to provide a leakproof hydraulic valve which is long-lasting and requires little maintenance.

It is yet another object of the present invention to provide a leakproof hydraulic valve with reduced flow turbulence and improved flow metering.

These and other objects and advantages of the present invention will be apparent to those of ordinary skill in the art from the following detailed description of the preferred embodiment presented herein.

DESCRIPTION OF THE PREFERRED EMBODIMENT

Figure 8:
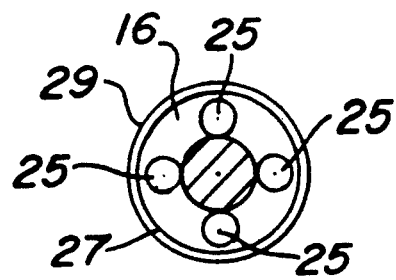
FIG. 8 is a top sectional view taken from FIG. 7 as shown in that figure.
Figure 9:
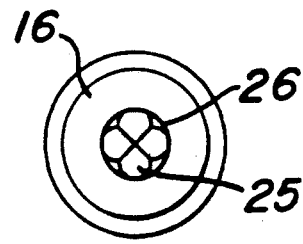
FIG. 9 is a bottom view of the valve stem shown in FIG. 7.

Reference will now be made to the preferred embodiment as shown in the figures of drawings. All figures, except FIGS. 8 and 9, depict longitudinal sectional views. Since the critical valve components are radially symmetrical about a central axis, this view best depicts the various features of the present invention.

Figure 4:
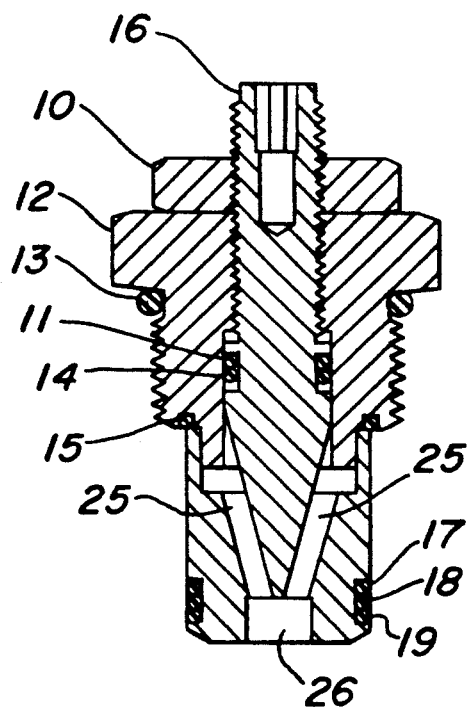
FIG. 4 is a side-sectional view of the present invention.

Referring now to FIG. 4, valve stem 16 is threaded into gland 12. Cap nut 10 is fitted about the valve stem at the top of the gland. Valve stem 16 is of unique construction more clearly shown in FIG. 7 which depicts this part in isolation. Seals 11, 13, 14, 15, 17, 18, and 19 are backup rings which prevent unwanted leakage of fluid past the various joints of the valve assembly when installed into the manifold cavity.

Figure 1:
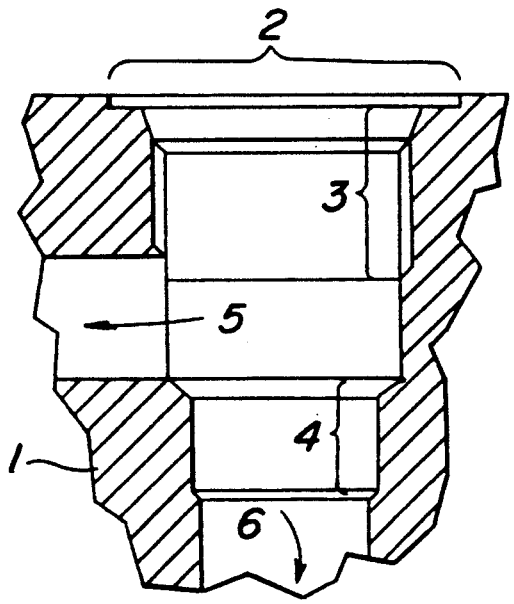
FIG. 1 is a side-sectional view of a prior art manifold cavity.
Figure 2:
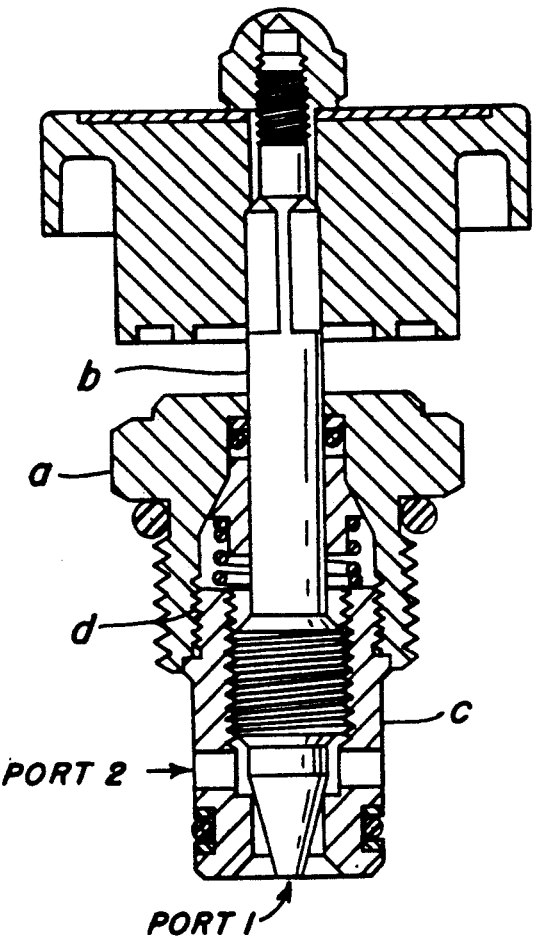
FIG. 2 is a side-sectional view of a prior art valve.
Figure 3:
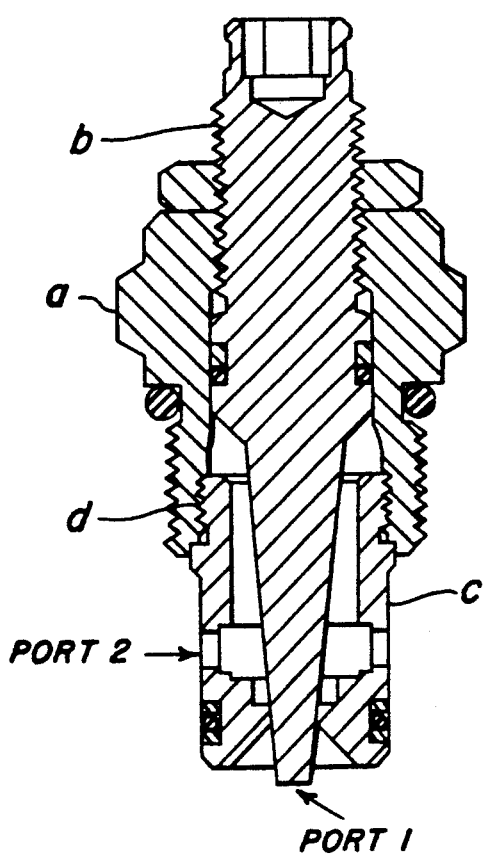
FIG. 3 is a side-sectional view of a prior art valve.
Figure 5:
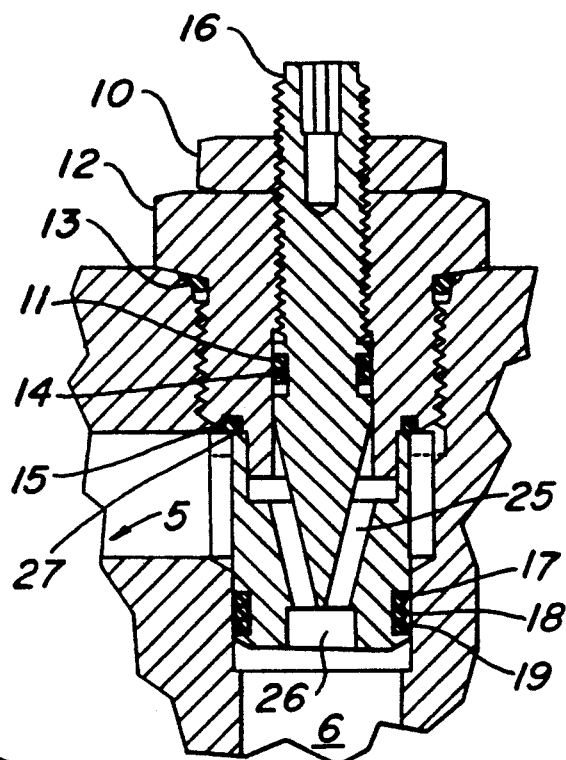
FIG. 5 is a side-sectional view of the present invention shown assembled into the manifold cavity of FIG. 1 with the valve shown in the close position.

Referring now to FIG. 5, the valve assembly of FIG. 4 is shown installed into a manifold cavity of the type shown in FIG. 1. The assembly includes gland 12 and valve stem 16 which are inserted into the cavity and threadably engaged with the manifold body. In this figure, the valve is depicted in the closed position. Valve stem 16 is a unitary structure which includes a valve piston integrally formed at the bottom. The stem is threaded into the gland and it will be readily understood from this drawing that as valve stem 16 is turned, the piston 28 moves reciprocally up and down within the cylinder at the bottom of the manifold cavity. The top part of the piston includes a collar 29 which moves into contact with seat 27 when the valve is in its closed position.

Fluid passing through the manifold enters port 6, passes through piston ports 25. flows past the valve seat, and then exists through port 5. Seals 17 and 18 isolate the flow through entry port 6 and receiving chamber 26 from other areas of the valve. The piston ports 25 disburse the fluid from the central receiving chamber 26 in the bottom of the piston radially outward to direct the fluid into the area of the valve seat above. The flow in this region is more clearly shown and will be later described in more detail with reference to FIG. 10.

Figure 6:
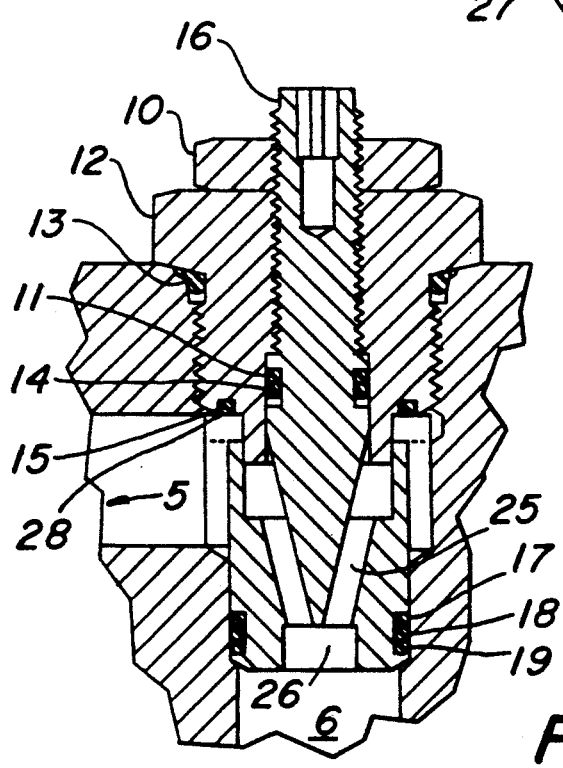
FIG. 6 is a side-sectional view of the present invention with the valve shown in the open position.

Referring now to FIG. 6, the valve assembly of FIG. 5 is shown, but with the valve in the open condition. In this case, the valve stem has been turned and moved downward with regard to the gland and manifold so that the top of the piston has moved away from the valve seat. Relative to FIG. 5, the piston has moved downward within the manifold cylinder and seals 11, 13 and 14 isolate the flow from piston ports 25 and through exit port 5 from other areas of the valve.

Figure 7:
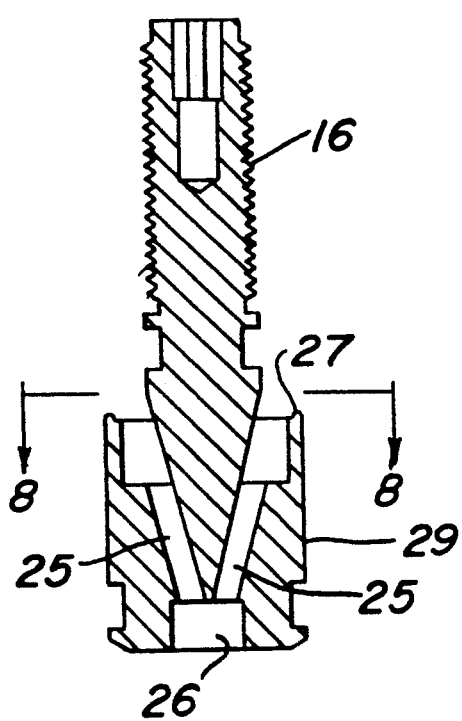
FIG. 7 is a side-sectional view of the valve stem.

FIG. 7 shows the unique valve stem in isolation. All fluid passing through the valve flows through the piston 28 by entering receiving chamber 26 and passing through ports 25. Four ports 25 are arranged about the circumference of the piston and are directed upward and radially outward toward the valve seat area from chamber 26. The shape and location of these ports enhances the compactness of the design, promotes low turbulence of the flow, and provides sensitive flow control of the valve. This is a critical feature of the invention and yields performance not achievable by the prior art.

FIG. 8 is a sectional view taken from FIG. 7 which shows the arrangement of ports about the top end of the piston. A rim 27 improves valve seating and is more clearly shown in FIG. 10. FIG. 9 is a bottom view of the valve stem showing the four (4) divergent piston ports 25 united a receiving chamber 26 which is centrally located in the bottom end of the piston.

Figure 10:
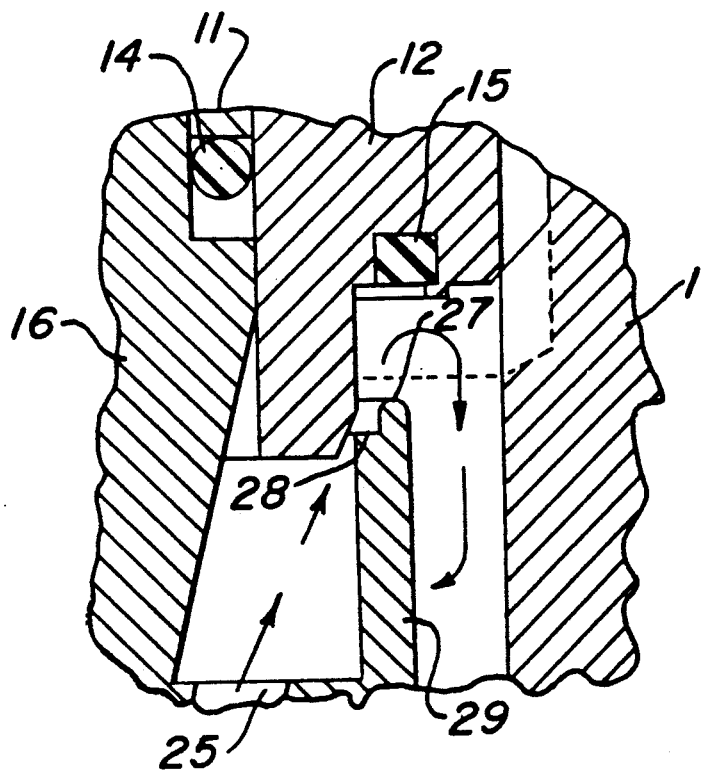
FIG. 10 is an enlarged side-sectional view taken from FIG. 6 in the area as shown in that figure.

Referring now to FIG. 10, the area around the valve seat with the valve in open position as shown in FIG. 6 is greatly enlarged for purposes of this illustration. It can be more clearly seen from this figure that one of the ports 25 directs fluid outwardly toward the valve seat. The piston includes collar 29 with rim 27, which becomes embedded into valve seat material 15 when the valve is closed. Rim 27 projects from the top of the collar about its circumference and is forced into the valve seat 15 at an increased unit pressure. The diameter of the valve seat is not co-extensive with the collar. The top of the collar 18 not occupied by the rim acts as a stop against the body of the gland, so that the valve seat cannot be damaged if the stem is over-tightened. Valve seat 15 is preferably composed of Nylon ® and is a separate insert fitted into the base of the gland 12. Shown in its open position here, the arrows indicate the direction and restriction of fluid flow between the circumference of collar 29 and gland nose piece 30. It can be readily seen from this figure that the nose piece is tapered at its extremity, thereby further aiding in the even flow of the fluid, as well as providing controllable flow metering. The tapering of nose piece 30 also greatly adds to the efficient flow characteristics and reduction of flow turbulence through the valve.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A cartridge-type hydraulic valve, comprising:
   a manifold cavity having entry and exit fluid ports;
   a gland removably secured within said manifold cavity, said gland having a circular valve seat in the bottom thereof;
   a valve stem having a piston at the bottom, said stem and piston being movable within said gland between open and closed valve positions, the top end of said piston being in contact with said valve seat when said valve is in the closed position;
   a plurality of piston ports open through opposing top and bottom ends of said piston, said piston ports being radially divergent upward from a central point at the bottom end of said piston to points around the circumference of the top end of the piston in the area of the valve seat; and
   said bottom of said piston being in fluid communication with said entry port and the top of said piston being in fluid communication with said exit port, whereby movement of said piston selectively restricts the flow of fluid through said manifold cavity.

2. The valve of claim 1, further including a collar located at the top end of said piston and protruding therefrom, said collar being a contact line of said piston with said gland, thereby acting as a stop to prevent over-tightening of said valve.

3. The valve of claim 2, further including a rim projecting upward along a portion of the top of said collar about its circumference, said rim embedding into said valve seat when said valve is closed.

4. The valve of claim 3, further including a tapered nose piece at the bottom of the gland in the center of the valve seat, said nose piece being convergent downward toward said piston and away from said valve seat.

5. The valve of claim 4, wherein said piston is reciprocal within a cylinder in the bottom of the manifold cavity, said entry port being at the bottom of said cylinder.

6. The valve of claim 5, further including a plurality of seals mutually engaging the outside of said piston and inside of said cylinder to prevent passage of fluid between the outside of the piston and the cylinder.

7. The valve of claim 6, wherein said gland is threadably engaged into the top of said manifold cavity.

8. The valve of claim 7, wherein said stem is threadably engaged into the center of said gland whereby turning the top of said stem moves the piston reciprocally between open and closed positions.

9. The valve of claim 8, wherein said valve seat is composed of Nylon ®.

* * * * *